Figure 1:
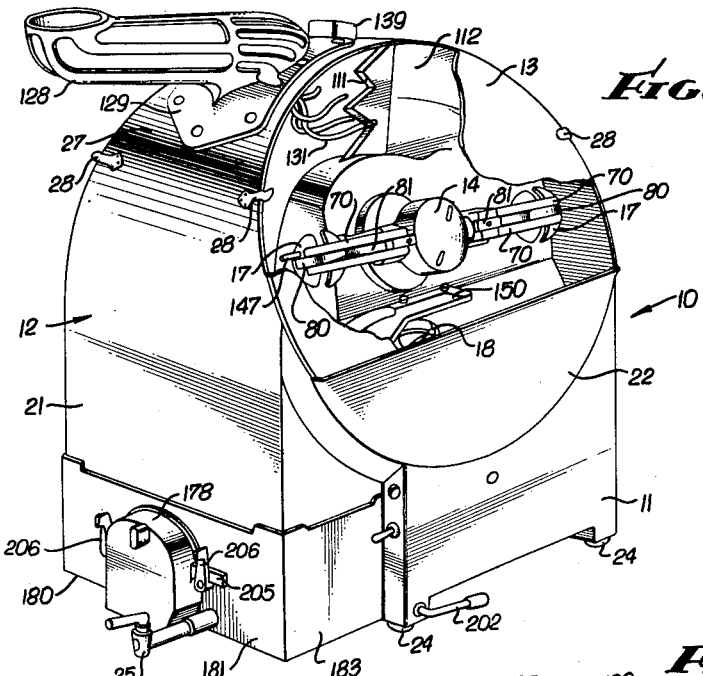

Oct. 27, 1964     J. H. BATCHELOR ETAL     3,154,122
FRUIT JUICE EXTRACTING DEVICE
Filed May 14, 1962                          4 Sheets-Sheet 1

INVENTORS.
JOHN H. BATCHELOR
NORMAN S. DENNIS
By Miketta and Glenny
ATTORNEYS

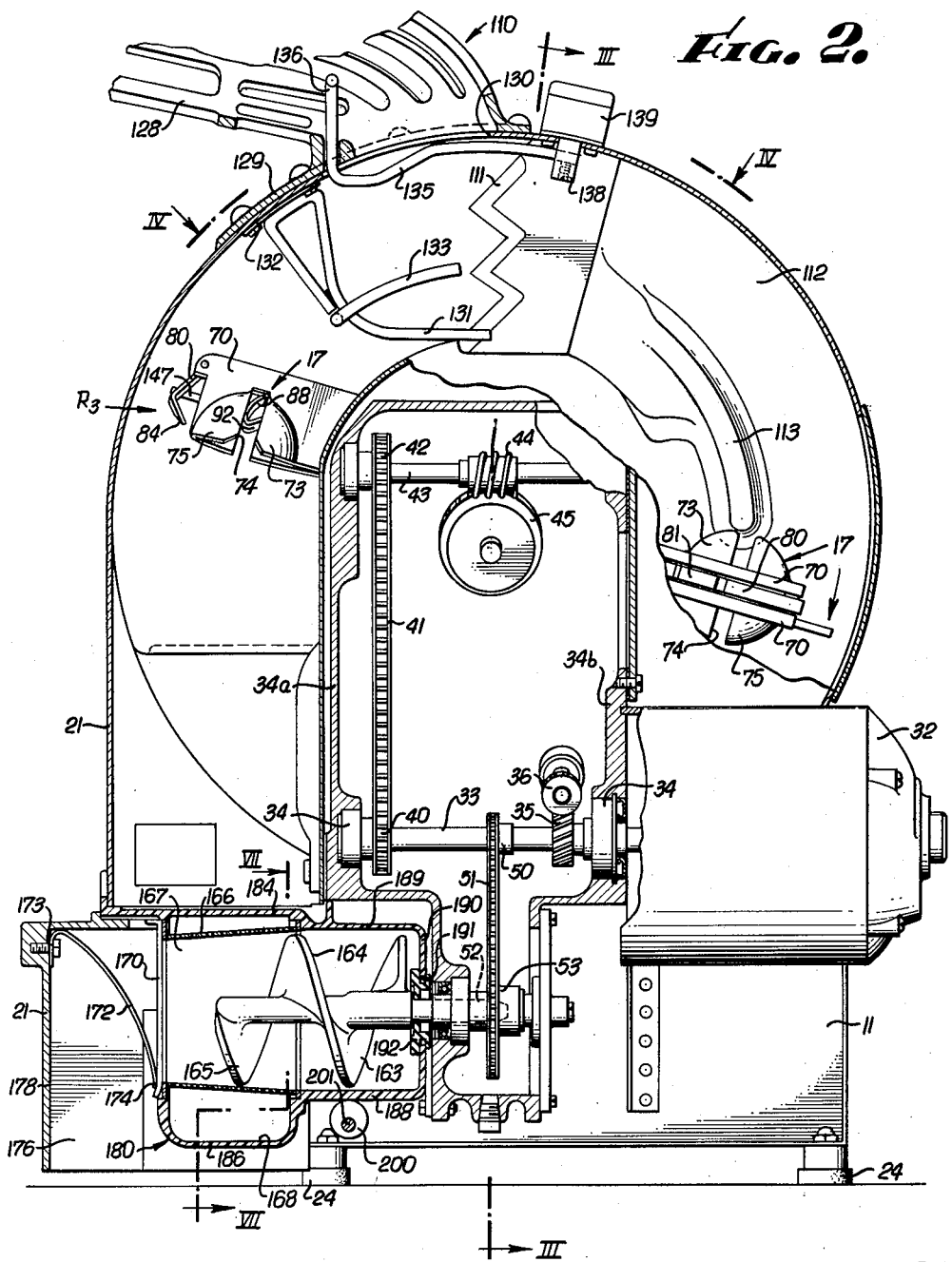

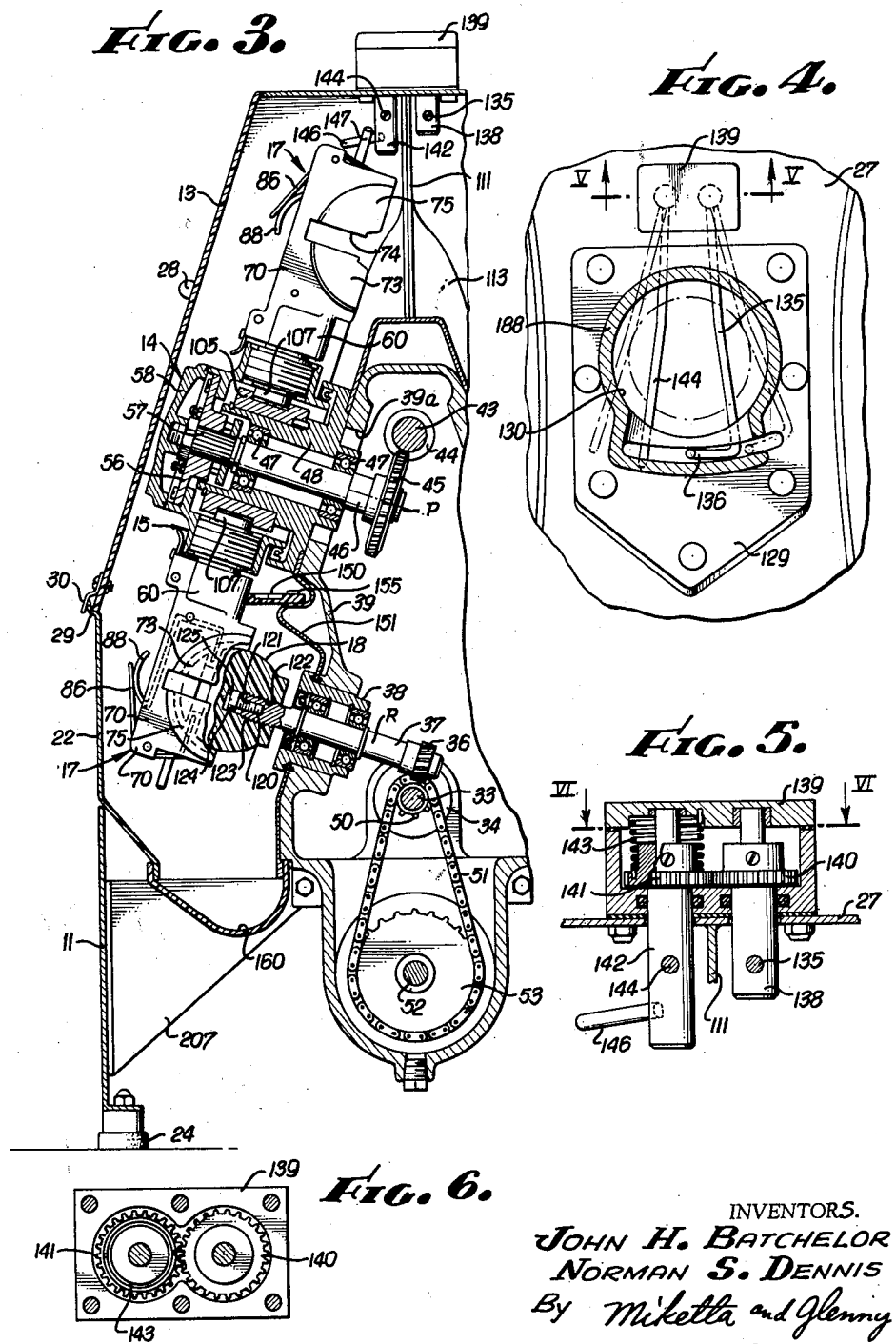

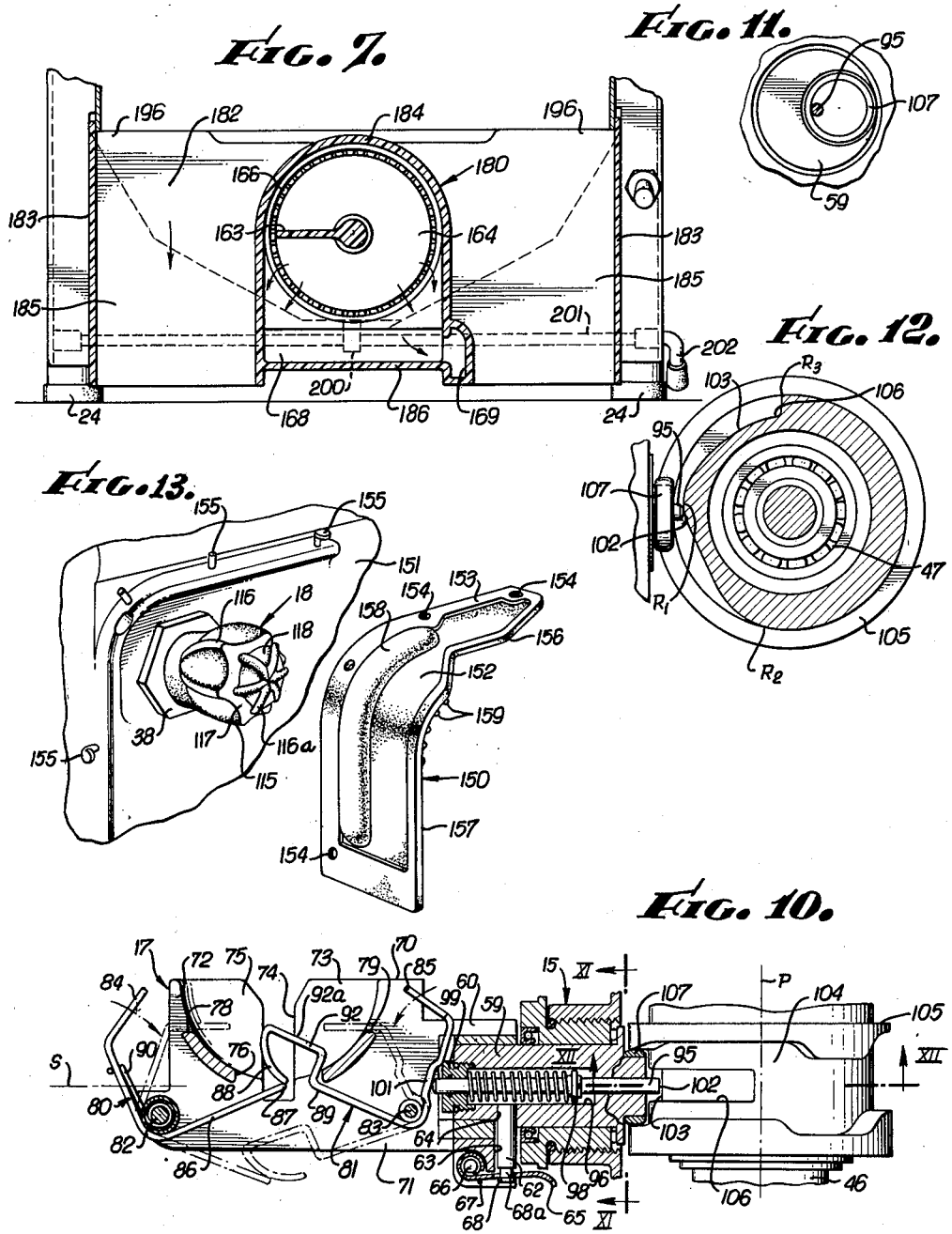

United States Patent Office 3,154,122
Patented Oct. 27, 1964

3,154,122
FRUIT JUICE EXTRACTING DEVICE
John Howard Batchelor, Los Angeles, Calif., and Norman Spencer Dennis, New York, N.Y., assignors to Rotary Juicer Co., Inc., New York, N.Y., a corporation of Nevada
Filed May 14, 1962, Ser. No. 194,397
13 Claims. (Cl. 146—3)

This invention relates to a fruit juice extracting device and more particularly to a juice extracting device wherein a fruit holder is moved into cooperable reaming relationship with a generally spherical reamer for extracting juice from a fruit portion carried by the fruit holder.

The fruit juice extracting device of the present invention contemplates improvements on the extracting device described and claimed in Patent 2,753,904 issued July 10, 1956. In Patent 2,753,904, an extracting device is described wherein a citrus fruit is fed to the top of the device and is picked up by a pair of cooperative fruit holders, each holder having a generally half-spherical cavity or recess for receiving approximately half of the fruit. The pair of fruit holders have their cavities facing the direction of travel of the fruit holders and as they contact the fruit, the fruit holders are turned to close upon the fruit and to hold it while the fruit is pressed against a knife blade for cutting the same in halves. The fruit holders with fruit halves carried in their cavities now diverge in their paths and carry the fruit halves to a rotating, generally spherical reamer. As the fruit holder approaches the reamer, the face of the fruit half therein is faced toward the reamer and as contact is made, the fruit holder is turned rapidly about the reamer so that as the fruit holder departs from the reamer, the face of the fruit is still directed toward the spherical reamer. Extracted juice from said fruit half is collected beneath the reamer and the skin of the fruit is later ejected from the fruit holder. The fruit holder is then turned to accept and receive a second fruit. In the aforesaid patented device, each fruit holder is rotated about a primary axis in a circular path which converges with the other fruit holder at the top of said path and diverges at the bottom of said circular path where engagement with the reamers occurs. The fruit holder while rotated about this primary axis is also turned about a secondary axis in order to provide a desired reaming relation and wiping action as it passed over the spherical reamer.

The present invention contemplates improvements to the fruit extracting device described above. Among improvements contemplated by the present invention is an improved fruit feed means whereby only one fruit is permitted to be introduced into the path of the fruit holders at one time; a novel securement means for a fruit portion in the fruit holder; a novel ejection means for the skin of the fruit portion from the fruit holder; a novel actuating means for the securement means and ejection means; a novel spherical reamer construction including adjustment means therefor; splash guard means for juice extracted at the reamer; and improved means for squeezing or removing juice from pulp extracted from the fruit half.

The primary object of the present invention therefore is to disclose and provide a fruit juice extracting device adapted to effectively and efficiently extract juice from fruit such as citrus fruit, including oranges and the like.

An object of the invention is to disclose and provide a juice extracting device wherein a maximum amount of juice is extracted without disturbing peel oil in the fruit skin regardless of peel thickness.

Another object of the invention is to disclose and provide a juice extracting device readily adjustable and adaptable to fruit of different skin thickness.

A further object of the invention is to provide a fruit holder construction having positive fruit securement means and ejectment means actuated by means directly correlated with the position of the fruit holder in its path of movement.

Many other objects and advantages of the present invention will be readily apparent from the following description of the drawings in which an exemplary embodiment thereof is shown.

Figure 8:
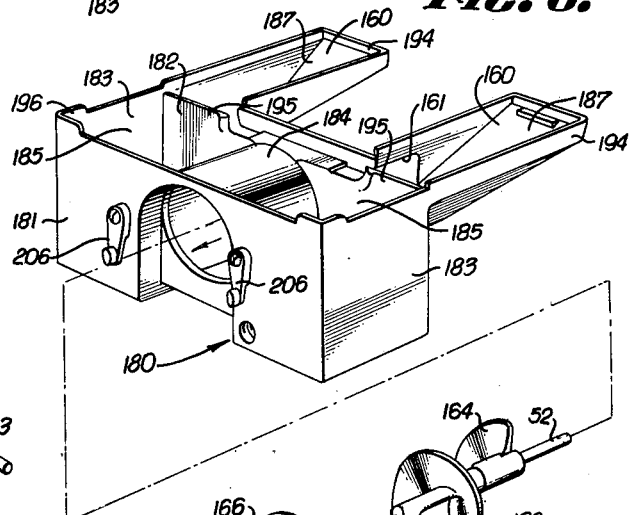
Figure 9:
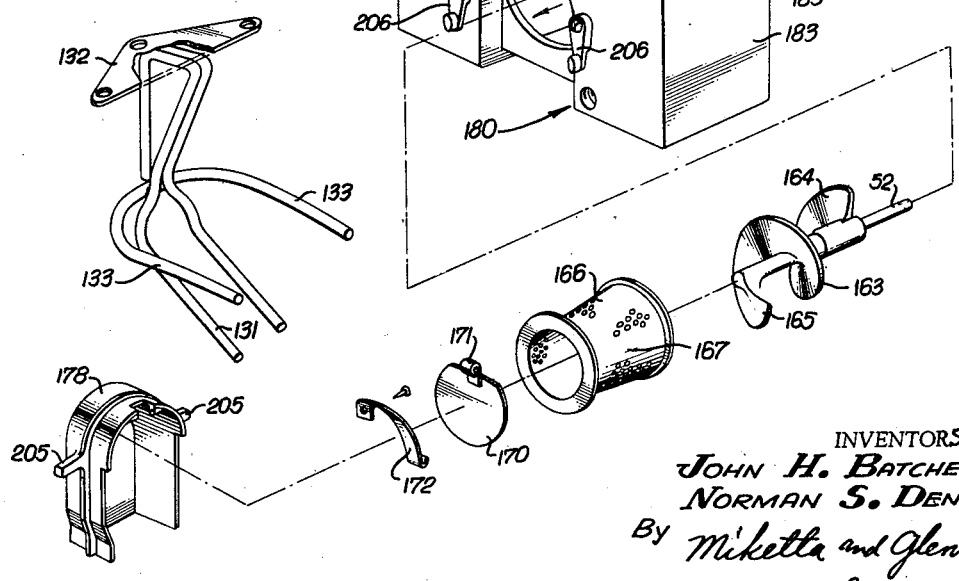

In the drawings:
FIG. 1 is a perspective side view of a fruit juice extracting device embodying this invention.
FIG. 2 is an enlarged fragmentary sectional view of FIG. 1 taken in a plane generally vertically bisecting the device.
FIG. 3 is a fragmentary sectional view taken in the planes indicated by line III—III of FIG. 2.
FIG. 4 is a fragmentary enlarged view taken from a viewpoint indicated by line IV—IV of FIG. 2.
FIG. 5 is a sectional view taken in the plane indicated by line V—V of FIG. 4.
FIG. 6 is a sectional view taken in the plane indicated by line VI—VI of FIG. 5.
FIG. 7 is a fragmentary sectional view taken in the vertical planes indicated by line VII—VII of FIG. 2.
FIG. 8 is an exploded perspective view of the pulp and juice strainer means shown at the left bottom corner of FIG. 2.
FIG. 9 is a fragmentary perspective view of fruit guide means carried adjacent the top of FIG. 1.
FIG. 10 is a fragmentary sectional view taken in a plane generally bisecting the fruit holder arm and fruit holder along its longitudinal axis.
FIG. 11 is a fragmentary transverse sectional view taken in the plane indicated by line XI—XI of FIG. 10.
FIG. 12 is a fragmentary sectional view taken in the plane indicated by line XII—XII of FIG. 10.
FIG. 13 is a fragmentary exploded perspective view of juice splash guard means associated with each reamer shown in FIG. 1.

A fruit juice extracting device generally indicated at 10 embodying the present invention may comprise a base 11, an upstanding hollow housing or cover means 12, transparent side windows 13 for said housing, a pair of turret heads 14, only one of which is shown. Both sides of the machine are virtually identical, only one side being described for brevity. The turret heads 14 are rotatable about primary axes P and carry oppositely extending stub arm means 15 defining a secondary axis S about which fruit holders 17 may selectively, independently turn in a manner similar to that described in said patent. A rotatable reamer projects from the side of housing 12 and is rotatable about an axis R generally parallel to axis P and is positioned in proximity to the lower portion of the circular path of the fruit holders on each side of the housing so as to cooperate with the fruit holders in a manner similar to that described in said patent for reaming juice from a half-fruit carried by holder 17.

Base 11 may comprise side walls 22 and support brackets 207 (FIG. 3). Suitable foot pads 24 are connected to base 11 rearwardly from housing front wall 21 so that the front portion of the extractor device 10 may overhang an edge of a counter or other support surface so that a suitable receptacle may be positioned for receiving ejected peels and pulp, as later described.

The housing 12 may comprise a suitably configured housing wall 27 serving to substantially enclose the juice extracting means therewithin. Wall 27 may carry a pair of spaced clips 28 adapted to secure transparent window 13, said window 13 having its bottom edge seated on a shoulder at 29 on side wall 22 and retained thereon by suitable depending angle clips 30. Each window 13 may be quickly and readily removed for access to turret head 14 and fruit holders 17 for inspection, removal and cleaning. The windows 13 permit observation of the juice extracting process and are sufficiently large in area that servicing of the extractor means within the housing may be accomplished without complete disassembly of the device.

The exemplary drive means of device 10 is somewhat different than the drive means shown in said patent, although it will be understood that any suitable drive means may be employed. The exemplary drive means may include a motor means 32 carried by wall 34b adjacent the rear thereof and having a forwardly projecting motor shaft 33 suitably mounted in bearings 34 carried by front and back upstanding walls 34a and 34b carried by base 11. Adjacent one of the bearings 34, motor shaft 33 carries a bevel gear 35 in meshed engagement with a pinion bevel gear 36 carried at the inner end of reamer shaft 37 mounted in suitable bearing means 38 on a side wall 39. The outer end of reamer shaft 37 carries the generally spherical reamer 18.

Adjacent the other bearing 34, shaft 33 carries a sprocket 40 having meshed engagement with a drive chain 41 engaged at its top by a sprocket 42 carried on a shaft 43 provided with a worm thread 44 meshing with a helical or bevel gear 45 carried at the inner end of turret shaft 46. Turret shaft 46 may be mounted in suitable bearing means 47 mounted in a stationary turret sleeve 48 carried by wall 39 and secured thereto in any suitable manner. Wall 39 has an opening 39a through which gear 45 may pass in assembly and disassembly. Selected rotation of reamer 37 and of turret shaft 46 is thus provided.

The drive means also includes an intermediate sprocket 50 on shaft 33 serving to connect through chain 51 and sprocket 53, a conveyor shaft 52 adjacent the bottom of the housing for conveying fruit pulp and pressing out juices remaining therein as hereinafter described.

Each turret head 14 (FIG. 3) includes stationary turret sleeve 48, a turret mounting plate 56 splined at 57 on the outer end of turret shaft 46 and covering the open end of sleeve 48, a cover 58 for plate 56, and a pair of oppositely directed stub arm means 15 secured in suitable manner to plate 56. The inner ends of stub arms 15 are spaced from turret sleeve 48 and each stub arm 15 (FIG. 10) includes a radially outwardly extending core member 59. The outer end of core member 59 is received within a hub 60 of fruit holder 17.

Means for quickly assembling or disassembling fruit holder 17 from stub arm means 15 may include a releasable locking pin 62 (FIG. 10) received within a radially directed recess 63 in the end face of hub 60 and extending into a port 64 in core member 59. The outer end of pin 62 is connected to clip 65 pivotally mounted at 66 to hub 60 and biased inwardly by a spring 67 to urge pin 62 into locking relation with core member 59. A suitable connection between pin 62 and clip 65 may be a slot in clip 65 and a groove 68a below head 68 on pin 62. Pin 62 immovably locks holder 17 on core member 59 so that holder 17 will turn with core member 59 in accordance with a preselected turning path as hereafter described.

Fruit holder 17 may comprise a pair of spaced, parallel walls 70 defining therebetween a longitudinal slot or opening 71. Spaced walls 70 support in longitudinal spaced relation an outer generally spherical sector wall 72 and an inner spherical sector wall 73 which span opening 71 and which terminate in spaced relation in side slots 74, said slots 74 extending into a portion of walls 70. Sector walls 72 and 73 form a generally partially or semi spherical cavity 75 for reception of a fruit portion or fruit half. The bottom of cavity 75 is provided with a longiutdinal extending opening 76 in alignment with slot 71. The radius of curvature of inner spherical sector wall 73 may be slightly greater than the radius of curvature of outer spherical sector wall 72. Sector walls 72 and 73 are provided with top openings 78 and 79 in alignment with slot 71 and slot 76.

Securing and ejecting means for a fruit portion received within cavity 75 comprise a pair of cooperable companion angle-shaped piercing members 80 and 81 pivotally mounted at 82 and 83 respectively for movement between walls 70 and within slot 71. Each piercing member 80 and 81 includes a piercing point 84 and 85 for piercing and holding a fruit portion received within cavity 75. Piercing member 80 includes a radially inwardly extending leg element 86 having a plain end 87 adapted to normally slidably contact a curved face 88 provided at the corresponding end of radially outwardly extending leg 89 of the piercing member 81. Piercing member 80 may be biased by spring 90 into normally retracted position of the piercing point 84 and contact of end 87 with curved face 88 holds piercing member 81 with its piercing point 85 in retracted position. Thus, the two members 80 and 81 are normally cooperable to be positioned in retracted position or in non-fruit piercing position.

Member 81 includes an offset engagement or ejectment portion 92 between the curved face 88 and the main portion of leg 89. The ejectment portion 92 includes a rectangular ejectment face 92a of substantial area movable through opening 76 at the bottom of the cavity. In normally retracted position of members 80, 81, ejectment portion 92 projects substantially into cavity 75 and faces the cavity opening. In such projected position, a fruit portion is positively ejected from cavity 75.

Actuating means for piercing members 80 and 81 may comprise a follower push rod 95 longitudinally movable within axial bore 96 of core member 59 and normally biased by spring 97 toward the primary axis P or turret shaft 46. A suitable collar 98 may be secured to rod 95 for seating one end of spring 97, the opposite end of spring 97 being seated in a threaded plug 99 fitted in bore 96 of core member 59. The outer end of rod 95 may contact and engage a debossment 101 on piercing member 81, said debossment 101 providing an elongated recess in the face of member 81 for guiding retaining contact with the outer end of push rod 95.

The opposite end of push rod 95 projects from core member 59 for camming engagement at 102 with a cam face 103 provided in bottom surface 104 of cylinder cam 105 carried by turret sleeve 48. The cam face 103 includes the bottom face of recess 106 interrupting surface 104 and is selectively configured to provide desired movement of push rod 95 to actuate piercing members 80, 81.

Before describing the particular action of cam face 103 and push rod 95, it may be noted that cylinder cam 105 may be contoured similarly to that shown in the aforesaid patent, and that said cylinder cam is engaged by a cam wheel 107 carried by core member 59 and arranged to cause turning of core member 59 to turn fruit holder 17 about its axis in a particular manner. Briefly, in one cycle of holder 17 about axis P, cylinder cam 105 and cam wheel 107 causes holder 17 to face inwardly or towards the opposite fruit holder just after the fruit holders grasp a whole fruit admitted to the fruit holder path by fruit feed means 110. Each fruit holder maintains this inwardly facing relationship as the whole fruit is driven against knife blade 111, is cut half in two, and the fruit half portion received within a cavity 75 is moved across a pressing surface 112, the fruit half being positively pressed into cavity 75 by a generally centrally disposed curved inclined smoothly surfaced embossed or rib 113. Cylinder cam 105 then causes fruit holder 17, after leaving rib 113, to turn downwardly to face reamer 18. As the fruit face is engaged by reamer 18, cam 105 causes the fruit holder to turn or wipe over reamer 18 so that the reamer completely and thoroughly removes juice and pulp from the fruit half. As the fruit holder departs from the reamer, cam 105 causes the fruit holder to face reamer 18 in such departure. This position of the fruit holder is generally maintained until the fruit skin has been ejected and then just before the fruit holder reaches the feed means 110 for grasping a second fruit, the fruit holder is rapidly turned inwardly and then slightly outwardly so that the fruit holders will properly receive a whole fruit, close about the whole fruit, and then drive said fruit against knife edge 111.

The configuration of the push rod actuating cam face 103 is correlated with this turning movement of the holder. At point $R_1$, face 103 and rod 95 permit piercing points 85 to be in retracted position and out of the cavity 75. As the rod 95 proceeds along face 103 in the direction of point $R_2$, the rod is driven radially outwardly, the outer end of said rod pressing against debossment 101 and thus pressing the piercing member 81 about its pivotal axis 83 to urge the piercing point 85 into cavity 75 through the opening 79. As push rod 95 pivots piercing member 81, the leg 89 thereof presses end 87 of piercing member 80 rearwardly of the spherical cavity so that piercing member 80 is urged against spring 90 and piercing member 84 enters into cavity 75 in diametrically opposite relation to piercing member 85. When rod 95 reaches point $R_2$, closure of piercing points 84 and 85 is completed and a fruit half, which has been picked up by the fruit holders at knife blade 111, will be pierced and securely held by points 84 and 85. When point $R_3$ is reached, push rod 95 suddenly drops into one end of recess 106. At such point $R_3$, piercing points 84 and 85 are immediately retracted from cavity 75 and from the fruit skin, spring 90 immediately biasing piercing member 80 in a direction to retract piercing point 84 and, at the same time, its leg 86 engages the companion piercing member 81 to retract its piercing point 85 from the cavity. While retraction of points 84, 85 occurs, it will be apparent that ejectment face 92 is driven by spring 90 and legs 86, into cavity 75 and a fruit skin already released from points 84, 85 will be positively ejected therefrom. At point $R_3$, holder 17 is facing down (FIG. 2) and the ejected skin falls thru opening 185 into a suitable receptacle (not shown).

As rod 95 returns to point $R_1$, piercing points 84, 85 remain out of the cavity and slight retraction of ejectment face 92 is provided. Thus, when rod 95 reaches point $R_1$, ejectment face 92 will be adjacent the bottom of cavity 75 and pressure of pressing face 112 against the face of a fruit half will depress the ejectment face 92 to the bottom surface of cavity 75. Push rod 95 will not obstruct this movement of members 80, 81 and pressure against ejectment face 92 will be only resisted by the tension of spring 90.

It will be noted that fruit holder 17 passes over and about reamer 18 with a fruit portion held therein by piercing points 84 and 85 which are disposed within cavity 75. Reamer 18 may comprise a generally spherical reamer body 115 secured in suitable manner as by threading on the outer end of reamer shaft 37. The reamer body may include a plurality of longitudinally extending curved ribs 116. The reamer body is provided with an annular groove or recess 117 which defines an outer reamer segment 118, said segment being provided with ribs 116a formed as a continuation of ribs 116. As best seen in FIG. 3, piercing points 84 and 85 pass through annular groove 117 while fruit holder 17 passes over the reamer 18 in a juice extracting operation.

Means are provided for adjusting the position of the reamer body 18 with respect to the reamer shaft 37, such means including a stud bolt 120 adjustably threaded in a threaded bore 121 at the outer end of reamer shaft 37. The reamer 18 has a threaded bore 122 for threaded engagement with the threads at 123 on the outer end of shaft 37 and the bore 122 is sufficiently deep so that stud bolt 120, when adjustably threaded in the bore 121, will have its head 124 in abutment with the bottom face 125 of the bore 122. It will be apparent that longitudinal adjustment of stud bolt 120 will also provide longitudinal adjustment of reamer 18 so that proper spacing or relationship of reamer 18 may be made with respect to piercing points 84 and 85 and also with respect to thickness of the fruit skin. Annular groove 117 is sufficiently wide to provide for normal differences in thickness of the fruit skin while permitting free passage of the piercing points 84 and 85 through the annular groove.

Means are provided for advancing or feeding one fruit at a time into the path of the fruit holders 17. In FIGS. 1 and 2, a fruit infeed chute 128 may be secured by a suitable arcuate mounting plate 129 to cover 27 of the housing 12. The chute 128 passes fruit from a supply hopper (not shown) along an inclined path to a discharge opening 130 for a single fruit. Chute 128 may hold a plurality of fruit in line for discharge one by one. A fruit passed thru opening 130 may be supported in the circular path of fruit holders 17 by a pair of spaced, downwardly inclined bottom supporting elements 131 secured at their top to a plate 132 mounted on the inner surface of cover 27. Also supported from plate 132 may be a U-shaped yoke having curved side elements 133 for lateral support of a fruit. A fruit is normally positioned by gravity against the serrated knife edge 111. The side elements 133 are spaced from primary axis P a distance corresponding to the radius of the fruit holder side openings 74 so that as a fruit holder faces a fruit retained by elements 131, 133, the side elements 133 pass freely through the openings 74.

To prevent more than one fruit from falling into the path of fruit holders 17, stop means are provided adjacent opening 130 and may include a stop member 135 having an upwardly bent stop end portion 136 which normally projects into the feed path defined by chute 128. The inner end of stop member 135 is secured in a depending rotatable stub shaft 138 extending through cover 27 into a receptacle 139. The stub shaft 138 carries gear 140 having meshed engagement with a gear 141 on an actuating stub shaft 142 extending through cover 27 to a point below the end of shaft 138. The shaft 142 is normally biased into a selected position by a torsion spring 143 sleeved over the upper end of shaft 142 and connected at respective ends to receptacle 139 and to gear 141. The shaft 142 carries a stop element 144 which extends across opening 130. Torsion spring 143 normally biases the stub shafts 142 and 138 into a normally closed position of the elements 135 and 144.

Means to cause the stop means to open to admit one fruit at a time, includes an outwardly and rearwardly projecting pin 146 which extends into the path of an actuating radially outwardly directed member 147 projecting from the outer end of fruit holder 17. Thus, as fruit holder 17 picks up a fruit and drives the fruit against the knife edge 111 and then passes to one side of knife edge 111, the upwardly projecting member 147 contacts pin 146 and causes the stub shaft 142 to turn sufficiently to cause stop elements 135 and 144 to separate further, open and to admit one fruit to the fruit support holders 133 and 131. A fruit is thus held in position for pick-up by fruit holder 17 immediately after the fruit holders have picked-up the preceding fruit. Also, a succeeding fruit is not admitted to pick-up position by the upstanding stop end portion 136.

Protective or splash guard means 150 (FIGS. 3, 13) for each reamer 18 may be supported from a wall section 151 carried by internal wall 39. Guard means 150 may comprise a sheet 152 of reinforced flexible, pliant yet dimensionally stable, material having a relatively thick section peripheral border, including securement edge 153 provided with suitable ports 154 for receiving securement pins 155 spaced on wall section 151. The sheet 152 may include a top narrow portion 156 facing the approach of fruit holder 17 and a depending portion 157 extending across a portion of the path of fruit holder 17. Depending portion 157 includes an embossed reinforcing rib 158 extending into portion 156 to permit flexing and return of portion 157 as a fruit holder engages the inner surface thereof and passes thereby. The internal surface of portion 157 may be provided with transverse reinforcement ribs 159 adapted to laterally stiffen sheet 152 and to reduce frictional drag as the fruit holder pushes splash guard aside during operation.

When a fruit holder passes over reamer 18 in fruit extracting relation thereto, the fruit holder first contacts narrow portion 156 which tends to deflect any juice extracted by the reaming action downwardly towards a juice collector and drain channel 160 (FIGS. 3, 8). As the fruit holder engages the laterally widened depending portion 157, the portion 157 wipes the backside of the fruit holder and is deflected backwardly about rib 158. Portion 157 also serves to deflect juice extracted by the reamer downwardly to channel 160. Splatter of juice on windows 13 is thus virtually prevented.

During extraction of juice by reamer 18, it will be readily understood that pulp in the fruit is also extracted and is received by channels 160 and such mixture of pulp and juice is separated by the means hereafter described. Channels 160 on each side of the extractor device (FIG. 8), communicate through ports 161 with a juice and pulp conveying means comprising a worm or screw conveyor 163 driven by the drive means heretofore described for advancing juice and pulp. Conveyor 163 comprises a screw blade 164, the end of the blade being gradually tapered or slightly reduced in diameter as at 165. The conveyor 163 extends into a truncated cone-shaped screening member 166 having a screen wall 167 of suitable mesh. Beneath the end of conveyor 163, a chamber 168 is provided for receiving juice squeezed through screen wall 167, the juice then flowing to a conduit 169 having communication with spigot 25. It should be noted that in this extractor machine, the juice is collected in a receptacle not part of the machine because it is intended that the juice be immediately sold in such receptacle or consumed as fresh juice. Therefore, storage for juice is not provided.

Juice and pulp admitted into the screening member 166 is pressed by conveyor blade 164 toward the narrower end of member 166 and against pressure relief plate 170, having a hinge connection at 171 to the door 178. A leaf spring 172 is secured at one end to a door or closure 178 as at 173, and its opposite end is in biasing contact as at 174 with the lower edge portion of the pressure plate 170. Sufficient pressure is exerted by spring 172 against plate 170 to compact pulp thereagainst as the pulp is driven forwardly by the screw conveyor. The pulp is thereby further squeezed and juice extracted therefrom is collected with the more freely obtained juice. The spring pressure of leaf spring 172 is selected so that virtually all of the juice is extracted from the pulp and plate 170 is opened a selected amount to provide a preselected steady relief flow of virtually dry pulp into chamber 176 for collection by suitable means.

In this example, the channels 160, chambers 168, ports 161 and the housing for the pulp and juice conveyor 163 and screen member 166 may be formed as parts of a readily removable and cleanable plastic body means 180 suitably molded from material non-reactive to juices extracted and adapted for sanitary cleaning. The body means 180 includes front and back walls 181 and 182 respectively, side walls 183, and a partially cylindrical wall 184 interconnecting walls 181 and 182 and enclosing screen member 166. The walls 181, 182, 183 and 184 define side passageways 185 through which the ejected fruit skins may fall to receptacles therebelow (not shown). Wall 184 includes a bottom wall portion 186 for directing juice to spigot channel 169 at one side of wall 184. Channels 160 include downwardly inclined converging walls 187 which smoothly merge with bottom wall portion 188 (FIG. 2) beneath conveyor 163 to feed, as by gravity, the pulp and juice extracted from fruit. Wall portion 188 and top wall portion 189 thereabove are connected by end wall 190 having an opening 191 to receive therethrough, in sealed relation as at 192, conveyor shaft 52.

Channels 160 are further defined by upstanding peripheral top margins 194 which together with top margins 195 of back wall 185 and front top corner margins 196 at front wall 181 are slidably upwardly fitted in assembly with bottom wall margins of the housing as shown.

A cam member 200 (FIG. 2) carried by a transverse shaft 201 mounted in side walls 22 of the base 11 is rotatable by crank 202 to move the housing means 180 upwardly or downwardly for assembly and disassembly. When housing means 180 is moved downwardly, it may be readily removed from the housing by forward movement thereof.

The cover 178 is readily removable from housing means 180, cover 178 including laterally extending arms 205 cooperable with pivoted latches 206. When cover 178 is removed, leaf spring 172 and pressure plate 170 in assembly therewith are also removed. The screen member 166 may then be disengaged from housing means 180 for cleaning.

It will be readily understood that the fruit juice extracting device 10 may be modified and changed in various ways which come within the spirit of the present invention and that all such changes and modifications coming within the scope of the appended claims are embraced thereby.

We claim:

1. In a fruit juice extracting device including a housing, a fruit holder having a fruit receiving cavity, a reamer means projecting from a face of said housing, means for moving the fruit holder into juice extracting relationship with said reamer means, means for rotating said fruit holder about a primary axis, and means for turning said fruit holder about a secondary axis lying in a plane perpendicular to said primary axis, the provision of: means on said fruit holder for securing a fruit portion in said cavity and for ejecting the fruit portion therefrom, said securing and ejecting means including an angle shaped piercing member pivotally mounted on said fruit holder and having a piercing point normally biased into retracted relationship with respect to the cavity of the fruit holder, a companion piercing member with a piercing point pivotally mounted on said fruit holder in opposite relation to the biased member and having a leg with means in contact with a corresponding leg of said biased member, said biased member normally causing said means on leg of the companion member to project into the cavity of the fruit holder for ejecting a fruit skin therefrom, and actuating means for said piercing members extending along said secondary axis for selective engagement with said companion piercing member for driving said piercing members and piercing points into fruit holding relationship with the fruit holder.

2. A device as stated in claim 1 wherein said means on said leg of said companion piercing member includes a curved face for contact by the leg of the biased member.

3. A device as stated in claim 1 wherein said means on said leg of said companion piercing member includes a push face retractable below the surface of the cavity of the fruit holder and projectable towards the opening of the cavity to eject a fruit portion therefrom.

4. In a fruit juice extracting device as stated in claim 1 wherein said actuating means includes a follower rod, and a cam face about said primary axis in camming engagement with said rod.

5. In a device as stated in claim 1 including quick release means for said fruit holder from said rotatable means at said primary axis.

6. In a fruit juice extracting device wherein a fruit holder having a cavity is turned about one axis for reaming engagement with a reamer and is moved in a direction towards and away from said reamer simultaneously with said turning, the provision of: means for securement of a portion of a fruit within said fruit holder before and during reaming; and cooperable means for ejecting the remainder of the fruit portion from said fruit holder after reaming, said securement means including cooperable pivotally mounted members having fruit piercing points disposed in spaced relation and adapted to pierce a fruit in a plane transverse to said one axis of said fruit holder, said members having portions in contact between pivotal mountings of the members, a spring acting on one member for normally biasing both members through said contacting portions into fruit piercing point retracted position, actuating means for moving said members out of retracted position and into fruit piercing position; said ejecting means including a projection on one of said members for extending into the cavity of the fruit holder when said actuating means is rendered ineffective and said spring urges said members into retracted position.

7. In a device as stated in claim 6 wherein said actuating means includes a movable follower rod extending along said one axis for engagement with one of said members.

8. In a fruit juice extracting device including a fruit holder having means thereon to hold a fruit half, the provision of: a generally spherical reamer rotatable about one of its axes; a plurality of embossed ribs on the surface of said reamer extending longitudinally of said one axis, said reamer being provided with an annular groove lying in a plane transverse to said one axis and between the center of said sphere and a pole defined by said axis, said groove being adapted to cooperate with a fruit holding means on a fruit holder.

9. In a fruit juice extracting device wherein a fruit holder having a cavity is turned about one axis for reaming engagement with a reamer and is moved in a direction towards and away from said reamer simultaneously with said turning, the provision of: means for securement of a portion of a fruit within the cavity of the fruit holder before and during reaming; and cooperable means for ejecting the fruit portion from said cavity after reaming; said securement means including cooperable movable members having fruit piercing points disposed in spaced relation and adapted to pierce a fruit in said cavity, said members having portions in contact behind said holder, a spring acting on at least one of said members for biasing both members through said contacting portions into fruit piercing point retracted position; actuating means for moving said movable members out of retracted position and into fruit piercing position; said ejecting means including means on one of said members extending into the cavity of the fruit holder when said actuating means is rendered ineffective and said spring urges said members into retracted position.

10. In a fruit juice extracting device wherein a fruit holder having a cavity is movable about an axis into cooperable relation with a reamer, the provision of: securement means for holding a fruit portion within said cavity before and during reaming; ejectment means for ejecting the fruit portion from said cavity after reaming; said securement means including cooperable fruit holding elements disposed in spaced relation and movable into the cavity to hold a fruit portion, said members having cooperable contact with each other, means for positioning said fruit holding members in retracted position and out of said cavity; actuating means for moving said fruit holding members into said cavity; said ejectment means including means on at least one of said members for extending into said cavity when said actuating means permits retraction of said members from said cavity by said retraction means whereby a fruit portion is forcibly ejected from the cavity.

11. In a fruit juice extracting device the combination of: a fruit holder having a cavity to receive and hold a fruit portion and having securement means for said fruit portion before and during reaming; said securement means including fruit holding elements extending into said cavity; ejectment means cooperable with the securement means for ejecting a fruit portion from said cavity after reaming and for withdrawing said fruit holding elements; and a reamer mounted to enter said cavity for reaming a fruit, said reamer having an external surface provided with a groove for receiving the fruit holding elements during reaming of the fruit portion and while said fruit portion is held by said securement means.

12. A device as stated in claim 11 wherein said groove in said reamer lies in a plane transverse to one of the axes of said reamer and between the center of said reamer and a pole defined by said axis.

13. In a fruit juice extracting device, the combination of: a fruit holder means including a wall defining a cavity adapted to receive and hold a fruit portion, said wall being provided with oppositely disposed openings; securement means for a fruit portion on said fruit holder means, said securement means including fruit holding elements movable into said cavity through said openings, said fruit holding elements being mounted for pivotal movement behind said wall; said securement means including associated ejectment means cooperable with movement of said fruit holding elements, said wall having an opening to receive said ejectment means therethrough for forcible ejectment of a fruit portion from said cavity; and reamer means rotatably mounted and arranged to be received in said cavity, said reamer means being configured to cooperably receive said fruit holding elements when they extend into said cavity in fruit holding position.

References Cited in the file of this patent

UNITED STATES PATENTS

| | | |
|---|---|---|
| 2,602,479 | Trainor | July 8, 1952 |
| 2,643,693 | Harden | June 30, 1953 |
| 2,737,989 | Wurgaft | Mar. 13, 1956 |
| 2,753,904 | Trainor | July 10, 1956 |
| 2,883,070 | Puccinell et al. | Apr. 21, 1959 |
| 3,016,075 | Mantelet | Jan. 9, 1962 |
| 3,025,976 | Roberts | Mar. 20, 1962 |

FOREIGN PATENTS

| | | |
|---|---|---|
| 442,988 | Italy | Dec. 3, 1948 |